United States Patent [19]

Sakai et al.

[11] Patent Number: 5,212,599
[45] Date of Patent: May 18, 1993

[54] ELECTRONIC CAMERA FOR SYNCHRONOUS RECORDING OF STILL PICTURES ON ROTATING RECORD MEDIUM

[75] Inventors: Shinji Sakai; Takashi Kawabata, both of Kanagawa, Japan

[73] Assignee: Canon Kabushiki Kaisha, Tokyo, Japan

[21] Appl. No.: 785,874

[22] Filed: Nov. 1, 1991

Related U.S. Application Data

[63] Continuation of Ser. No. 613,930, Nov. 12, 1990, abandoned, which is a continuation of Ser. No. 262,199, Oct. 19, 1988, abandoned, which is a continuation of Ser. No. 852,139, Apr. 15, 1986, abandoned.

[30] Foreign Application Priority Data

Apr. 17, 1985 [JP] Japan .................. 60-080354

[51] Int. Cl.$^5$ .................................. H04N 5/781
[52] U.S. Cl. .................... 360/35.1; 358/342; 358/906; 358/909
[58] Field of Search .............. 358/213.13, 213.19, 358/213.26, 335, 342, 906, 909; 360/33.1, 35.1, 37.1, 60

[56] References Cited

U.S. PATENT DOCUMENTS

| | | | |
|---|---|---|---|
| 4,366,501 | 12/1982 | Tsunekawa | 358/310 |
| 4,471,388 | 9/1984 | Dischert | 358/906 |
| 4,504,866 | 3/1985 | Saito | 360/35.1 |
| 4,517,611 | 5/1985 | Kimura | 360/60 |
| 4,544,959 | 10/1985 | Kozuki et al. | 358/906 X |
| 4,556,912 | 12/1985 | Yamanaka | 358/906 |
| 4,570,188 | 2/1986 | Ichiyanagi | 360/35.1 |
| 4,573,087 | 2/1986 | Teyuka | 360/60 |
| 4,591,016 | 9/1986 | Ochi | 358/906 |
| 4,599,657 | 7/1986 | Kinoshi | 358/335 |
| 4,622,596 | 11/1986 | Suga | 360/35.1 |
| 4,641,215 | 2/1987 | Kotoh | 358/906 |
| 4,658,304 | 4/1987 | Tsunekawa | 358/310 |
| 4,675,797 | 6/1987 | Hanma | 360/35.1 |

Primary Examiner—W. R. Young
Attorney, Agent, or Firm—Robin, Blecker, Daley & Driscoll

[57] ABSTRACT

An electronic camera for synchronous recording of still pictures on a rotating record bearing medium in which initialization of an image pickup element and release of a shutter are carried out in response to a release actuating signal, and, after the shutter is closed, the photoelectric information of the image pickup element is synchronously recorded on the medium, whereby the performance of an anti-blooming control for the image pickup element is limited in between the initialization of the image pickup element and the start of the synchronous recording.

47 Claims, 6 Drawing Sheets

ELECTRONIC CAMERA FOR SYNCHRONOUS RECORDING OF STILL PICTURES ON ROTATING RECORD MEDIUM

CROSS REFERENCES TO RELATED APPLICATION

This application is a continuation of application Ser. No. 07/613,930, filed Nov. 12, 1990, now abandoned, which is a continuation of application Ser. No. 07/262,199, filed on Oct. 19, 1988, now abandoned, which is a continuation of application Ser. No. 06/852,139, filed Apr. 15, 1986, now abandoned.

BACKGROUND OF THE INVENTION

1. Field of the Invention

This invention relates to an electronic camera for recording still pictures on a record bearing medium.

2. Description of the Prior Art

Electronic cameras for recording still pictures by synchronous recording on magnetic disks of small size have been proposed. For this kind of electronic cameras, there have been provided a wide variety of shutter control methods, any of which is to initiate accumulation of photo signals in synchronism with a reference signal, for example, a synchronizing signal representing a phase of rotation of a magnetic disk. As such prior art mention may be made of Japanese Laid-Open Patent Application No. SHO 58-117776 corresponding to U.S. Pat. No. 4,541,016 issued on Sep. 10, 1985. By such prior art methods, however, the time interval from the moment at which the release button has been pushed down to produce a trigger signal to the moment at which the image sensor really starts to accumulate was allowed to vary at random. Because this variation amounted up to 1/60 sec. (33 milliseconds) as the time lag, there was a problem when in application to sports photography, documentary photography, or other like photography where it is of great importance to take good timing for shots.

Another type of electronic camera in which as soon as the trigger signal is produced by the release button, the image pickup element is cleared and starts to accumulate photo signals has also been proposed in U.S. Pat. Application Ser. No. 452,500 filed Dec. 13, 1982 now U.S. Pat. No. 4,599,657. In such an electronic camera, the signals on the image pickup signal are then read out in order to be recorded on a recording medium while being moved by a servo drive based on a reference signal. As the timing for reading out and recording, a timing synchronized with when the aforesaid servo drive is locked is selected.

Such an electronic camera has a large advantage under the aim of minimizing the time lag from the production of the trigger signal of the release button to the start of recording. Yet there was left much more room for improvements.

That is, the time lag until the servo drive is locked cannot be maintained constant, differing from time to time. In case when such a time lag becomes long, noise, for example, due to the dark current is added to the signal obtained by the image pickup element so that video signals of high quality cannot be obtained. In this respect, room for improvements was left.

SUMMARY OF THE INVENTION

An object of the present invention is to provide a novel sequence of operations from the initiation of an exposure to the recording for the electronic camera as is different from the above-described prior art one.

A second object of the present invention is to provide an electronic camera which enables the time lag from the trigger signal of the release button to the accumulation of the actual picture to be shortened for improvements of the quality of video signals.

A third object of the present invention is to provide an electronic camera in which the range of variation of the time lag is minimized to facilitate further improvement of the quality of video signals.

A fourth object of the present invention is to provide an electronic camera with means for preventing occurrence of blooming during the accumulation of the actual image.

To achieve the above-described such objects, according to a preferred embodiment of the present invention to be described more fully later, the unnecessary charge on the image pickup element is once removed in response to the release trigger signal, and the shutter is opened in synchronism with such removal. After the image pickup element has been exposed for a prescribed time, as the shutter is closed, the signals in the image pickup element are read out in synchronism with a PG signal produced each time a disk-shaped recording medium rotates one revolution, and recorded on the medium.

Other objects of the present invention will become apparent from the following description of an embodiment thereof.

DETAILED DESCRIPTION OF THE PREFERRED EMBODIMENT

In the following, the embodiment of the invention is described by reference to the drawings.

Figure 1:
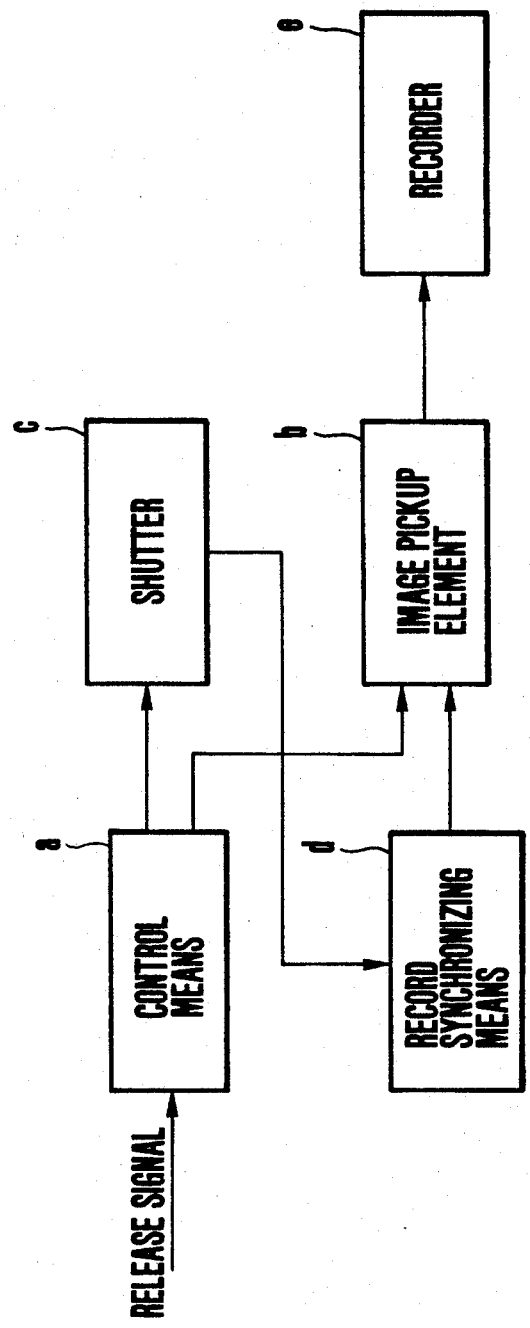
FIG. 1 is a block diagram illustrating the basic construction of an embodiment of the invention.

FIG. 1 illustrates the basic construction of the whole of the embodiment of the present invention.

Here, "a" is control means; "b" is an image pickup element, "c" is a shutter; "d" is recording synchronizing means, and "e" is a recording medium. The control means "a" performs initialization of the image pickup element "b" and opening and closing of the shutter "c" in response to a release signal. After the shutter "c" is closed, synchronous recording of photo-electrro information of the image pickup element "b" is performed by the record synchronizing means "d" on the recording medium "e" when it is rotating.

Figure 2:
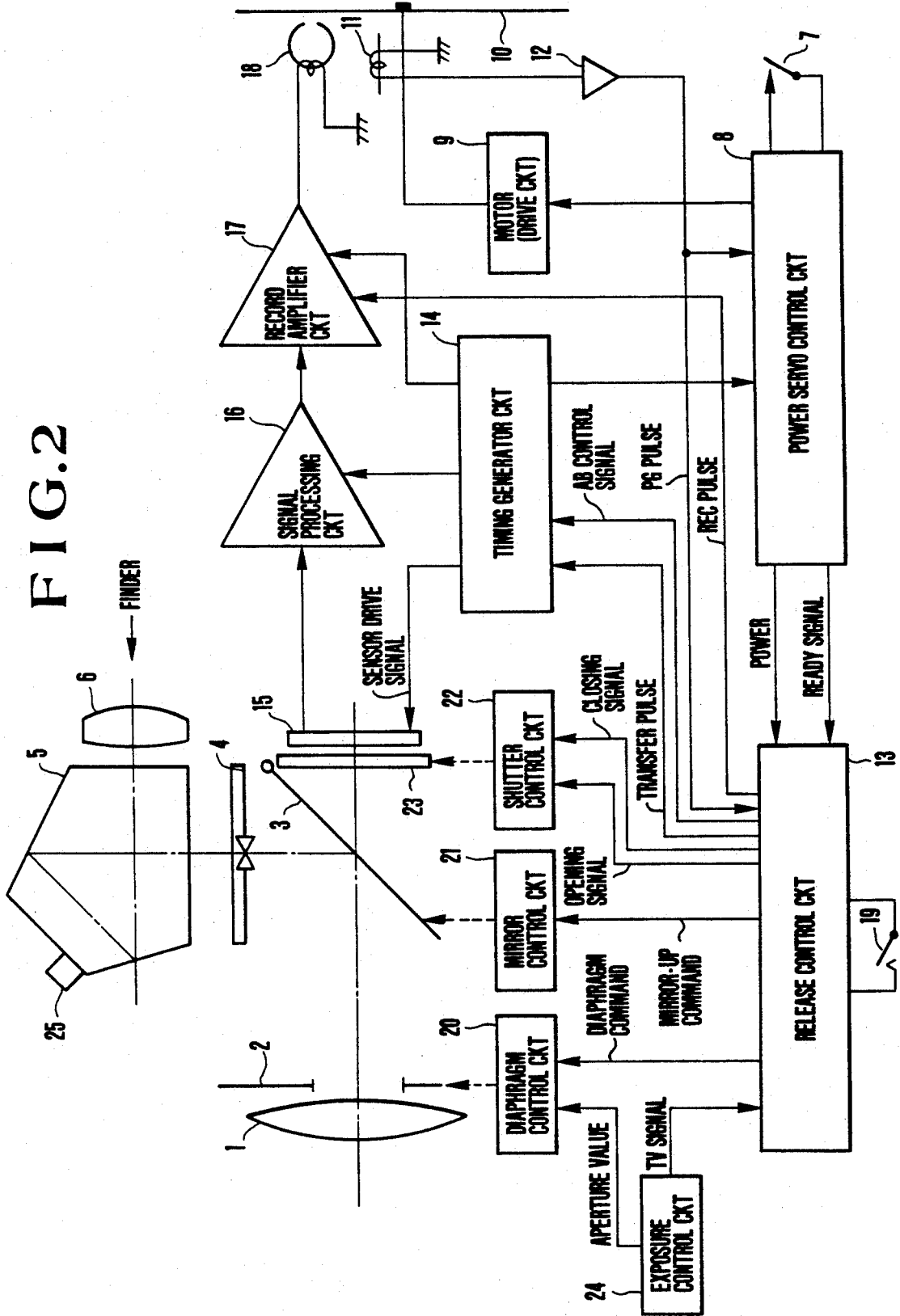
FIG. 2 is a block diagram illustrating an example of construction of a circuit of the embodiment of the invention.

FIG. 2 illustrates an example of construction of the circuitry of an electronic camera embodying the present invention. In this drawing, 1–6 are an optical system. Before and after an exposure, light passing through a lens unit 1 and a diaphragm 2 is reflection of a quick return mirror 3 to a focusing screen 4 on which an image of an object is formed. This image can be observed through a pentagonal roof type prism 5 and an eyepiece 6. Meanwhile, during the exposure, the mirror 3 as has moved upward about a pivor shaft by a mirror up-and-down control to be described later is out of the path of light from the lens unit 1 and diaphragm 2 to the image pickup element to be described later.

7-10 are a drive system. When in exposure, a battery servo control circuit 8 is rendered operative by closing a power switch 7, and a motor 9 starts to rotate. Thereby a magnetic disk 10 as the recording medium is rotated at a constant speed. Thus, a preparation for magnetic recording is made. The index (rotation angle) control of rotation of the magnetic disc 10 is carried out by the output pulses of the motor 9 and the PG pulses from a PG coil 11 with an amplifier 12.

13-18 are a recording system. By the transfer pulses of a release control circuit 13, sensor drive signals from a timing generator circuit 14 are applied to an image pickup element 15 (such as CCD). Thereby the video signals from the image pickup element 15 are read out, passing through a signal processing circuit 16 and a record amplifier circuit 17 to be recorded on a rotating magnetic disk 10 by a magnetic recording head 18.

19-24 are an image pickup control system. 19 is a release switch for producing a photographic command to the aforesaid release control circuit 13; 20 is a diaphragm control circuit for driving and controlling the diaphragm 2; 21 is a mirror control circuit for driving and controlling the mirror 3; 22 is a shutter control circuit for driving and controlling a shutter 23 arranged in front of the image pickup element 15; and 24 is an exposure control circuit for controlling the exposure in accordance with the amount of light measured by a photosensitive element 25 provided on the pentagonal roof type prism 5. The exposure control circuit 24 sends an aperture value to the diaphragm control circuit 20 and a TV signal to the release control circuit 13. Responsive to this TV signal, the release control circuit 13 sends a diaphragm command to the diaphragm control circuit 20.

Responsive to the ON operation of the release switch 19 indicating an exposure, the release control circuit 13 produces the diaphragm command, a mirror-up command and a shutter open-and-close command in sequence. By the diaphragm command, the diaphragm control circuit 20 works so that the size of aperture opening is automatically adjusted. By the mirror-up command, the mirror control circuit 21 works so that the mirror 3 is flipped upward for a certain time. By the shutter command, the shutter control circuit 22 opens and closes the shutter 23. Thereby, in a timing suited to projection, an optical image is projected on the image pickup element 15, and its image is recorded in coincidence with the index (angular position) of the magnetic disk.

Figure 3:
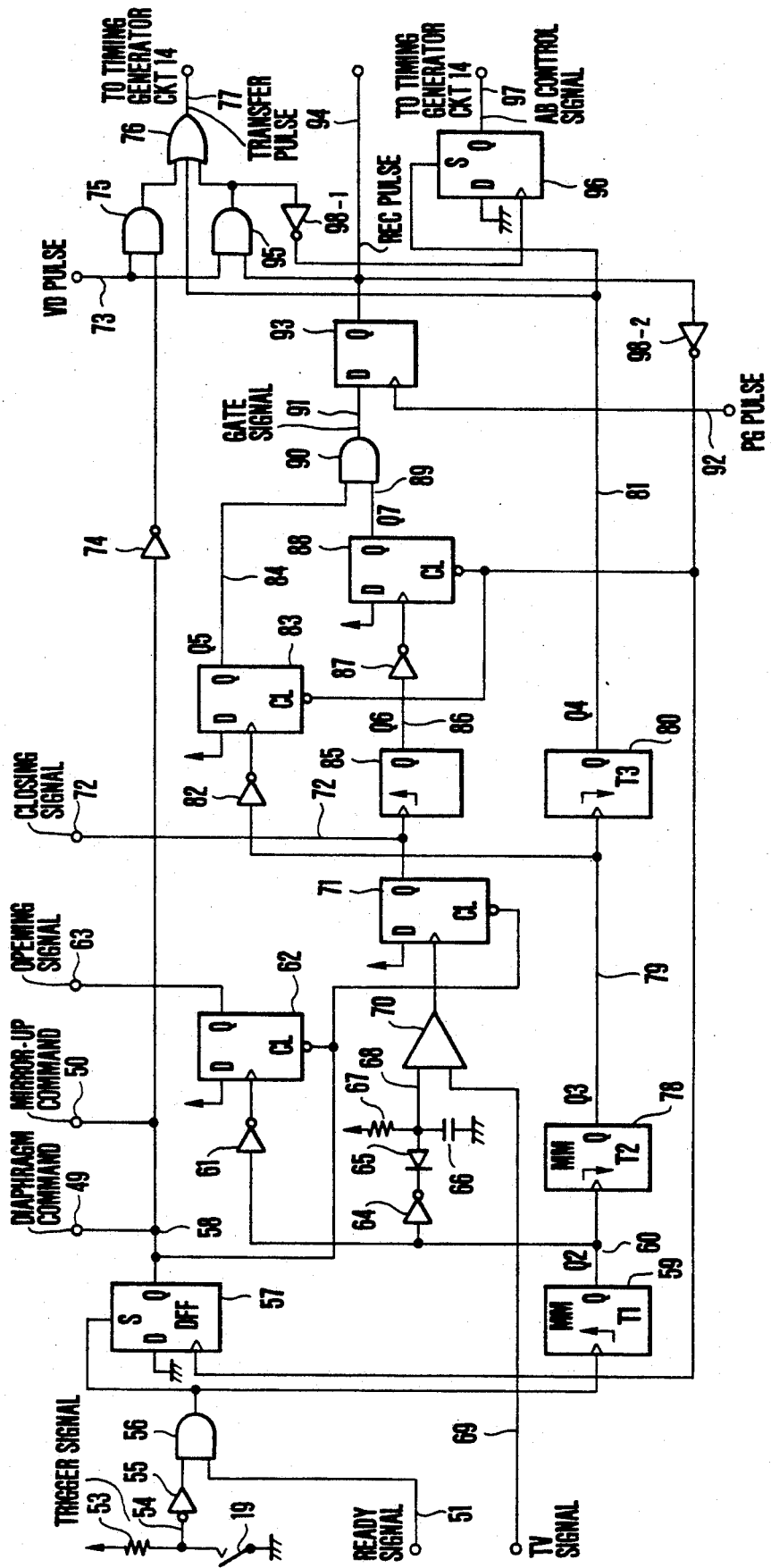
FIG. 3 is a circuit diagram illustrating an example of construction of the release control circuit of FIG. 2.
Figure 4:
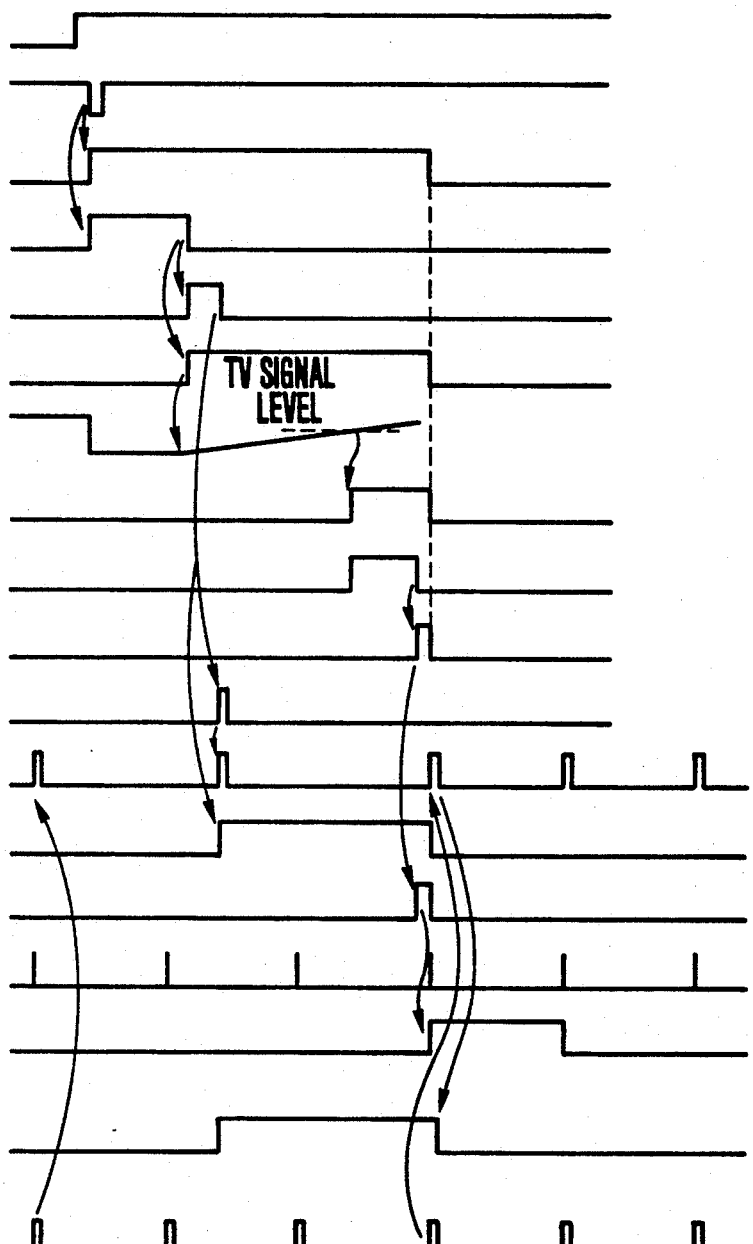
FIG. 4 is a timing chart to explain the operation of the invention whose construction is shown in FIGS. 2 and 3.
Figure 4:
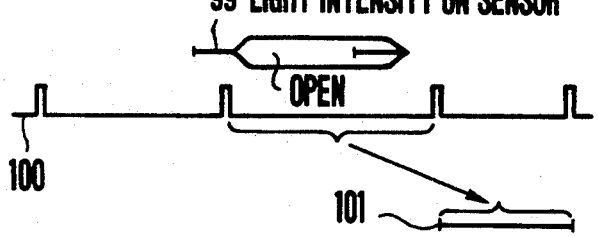

FIG. 3 illustrates an example of detailed circuit construction of the release control circuit 13 of FIG. 2, and FIG. 4 is a timing chart illustrating its operation. Next, by reference to FIGS. 3 and 4, the operation of the embodiment of the invention is described.

As the speed of rotation of the magnetic disk 10 reaches a prescribed value, when the preparation for magnetic recording is completed, the battery servo control circuit 8 produces a READY signal of high level which is received by the circuit of FIG. 3 through an input line 51. Also, in this embodiment, it is until the motor 9 rises that the image pickup element 15 is cleared in units of prescribed time by applying transfer pulses synchronized with PG pulses from the PG coil 11 or VD pulses. For note, in such a state, because the image pickup element 15 is shut out of light by the shutter 23, most of the unnecessary charge is produced by dark current. In the embodiment of the invention, however, as has been described above, means is provided for recycling the clearing operation of the image pickup element in the prescribed period before the shutter is opened in response to the trigger signal. This produces an advantage that the clearing of the image pickup element 15 becomes sufficiently effective when the trigger signal of the release button is produced.

Then, when the release switch 19 is turned on to initiate an exposure, a line 54 which is pulled up by a resistor 53 is changed to low, producing a trigger signal. By an inverter 55 of the next stage, the output of an AND gate 56 is changed to high to set a D type flip-flop (D-FF) 57. By this setting, an output line 58 of the D-FF 57 is changed to high, producing a signal Q1 representing the exposure-in-progress which functions as the diaphragm command appearing at an output terminal 49 and also as the mirror-up command appearing at another output terminal 50. So, the diaphragm 2 is automatically closed down to presetting, and the mirror 3 is moved upward.

At the same time, from the high output of the AND gate 56 is formed a time lag by a mono-multi vibrator 59 for production of an output Q2 in its output line 60. A D-FF 62 is then clocked through an inverter 61, producing a leading curtain signal indicating the shutter to open in its output line 63. Thereby the shutter 23 is opened.

Also, at the same time the output Q2 is passed through an inverter 64 and a diode 65 to a CR circuit 66, 67 by which a value of integration (time constant signal is made up in a line 68. This value of integration is compared with the level signal (TV signal) of an input line 69 from the exposure control circuit (AE circuit) 24 of FIG. 2 or a manually operated shutter time setting system (not shown) by a comparator 70. When the value of integration exceeds the level signal, a trailing curtain signal indicating the shutter to close is produced from an output line 72. Thereby the shutter 23 is closed.

Meanwhile, explanation is made about the initialization (clear) of the image pickup element 15 in response to the trigger signal. Since, in the time of non-exposure, the output of the inverter 74 which is the inversion of the low level of the output Q1 of the output signal 58 of the D-FF 57 is high, by vertical synchronizing signal (VD pulses) inputted into an input line 73 are produced transfer pulses as the output of an OR gate 76 through an AND gate 75 which are applied through an output line 77 of said OR gate to the timing generator circuit 14, thereby the CCD image pickup element 15 is caused to free run. In other words, the timing generator circuit 14 is triggered by the output of the OR gate 76 to produce pulses for driving the image pickup element 15. Therefore, as has been described above, the image pickup element 15 is cleared by the transfer pulses in prescribed periods ($V_D$).

Because the release is accepted in non-synchronism, the level fall of the output Q2 of the output line 60 of the mono-multi 59 of the front stage is responded by making up a pulse Q3 in the output line 79 of the mono-making multi 78 of the rear stage. The level fall of that pulse Q3 is received by a mono-multi 80 of the further rear stage in making a pulse Q4. This output pulse Q4 is given through the OR gate 76 to the output line 77, thereby, before the exposure, the transfer pulse is given through the timing generator circuit 14 to the CCD image pickup element 15, thereby the image pickup element 15 is cleared. Therefore, despite the before-mentioned transfer pulse of each the prescribed time ($V_D$), that transfer pulse which is responsive to the trigger signal is applied to the timing generator circuit 14, and the clearing of the image pickup element 15 is performed.

When the aforesaid sensor clear treatment ends, a D-FF 83 is clocked by the output of an inverter 82 which is the inversion of the output Q3 of the output line 79 of the mono-multi 78, so that an output Q5 of high level is produced in its output line 84.

After that, at a point in time when the exposure terminates, the trailing curtain signal (shutter closing signal) is produced in the output line 72, actuating a mono-multi 85 to make a time lag for closing the shutter in its output line 86. This time lag signal is applied through an inverter 87 to a D-FF 88, thereby the D-FF 88 is clocked to produce a recordable signal Q7 in its output line 89. The signal Q5 of the line 84 representing the sensor clear-off and the recordable signal Q7 of the line 89 are taken for logic product by an AND gate 90, and the definite recordable signal (gate signal) is produced in its gate output line 91.

Receiving the recordable signal of the signal line 91, a D-FF 93 produces an image-recording command REC pulse signal to its output line 94 in synchronism with the disk index signal (PG pulse signal).

When in recording the image, the REC pulse signal of the output line 94 and the vertical sychronizing signal (VD pulse signal) from the input line 73 are taken for logic product by an AND gate 95, and its result is outputted through the OR gate 76 to its output line 77, indicating the transfer output of the information to be recorded to the CCD image pickup element 15. Thereby the video signal of the image pickup element 15 is transferred through the signal processing circuit 16 and the recording amplifier circuit 17 to the head 18, and is recorded on a track of the rotating magnetic disk 10. Therefore, in this embodiment, the time lag from the opening of the shutter to make an exposure of the image pickup element 15 to the recording on the rotating magnetic disk is at most one vertical period. So the production of the noise component due to dark current in such a time lag can be as far minimized as possible. Further, in the embodiment, in order to preserve the good state of the signal in the image pickup element 15 during the time when to wait for the synchronization with the vertical synchronizing signal, in this instance, by a D-FF 96 which is set by the output Q4 of the output line 81 of the mono-multi 80 is produced an AB (anti-blooming) control signal in its output line 97, and by the output of an inverter 98 which is the inversion of the transfer command from the AND gate 95 is clocked the D-FF 96, thereby the AB control signal which is unnecessary during the transfer is reset.

Here, the preventing method of anti-blooming which is carried out by the AD control signal is next described by reference to FIGS. 5 to 7.

Figure 5:
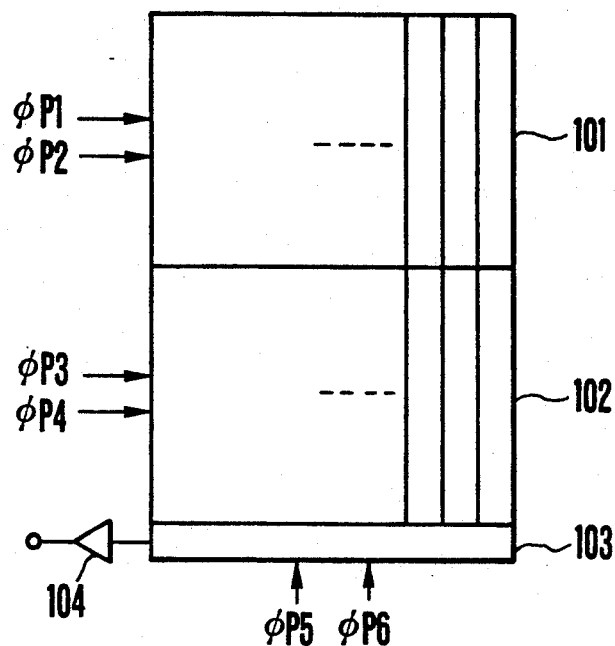
FIGS. 5 to 7 are drawings to explain the anti-blooming operation.
Figure 6:
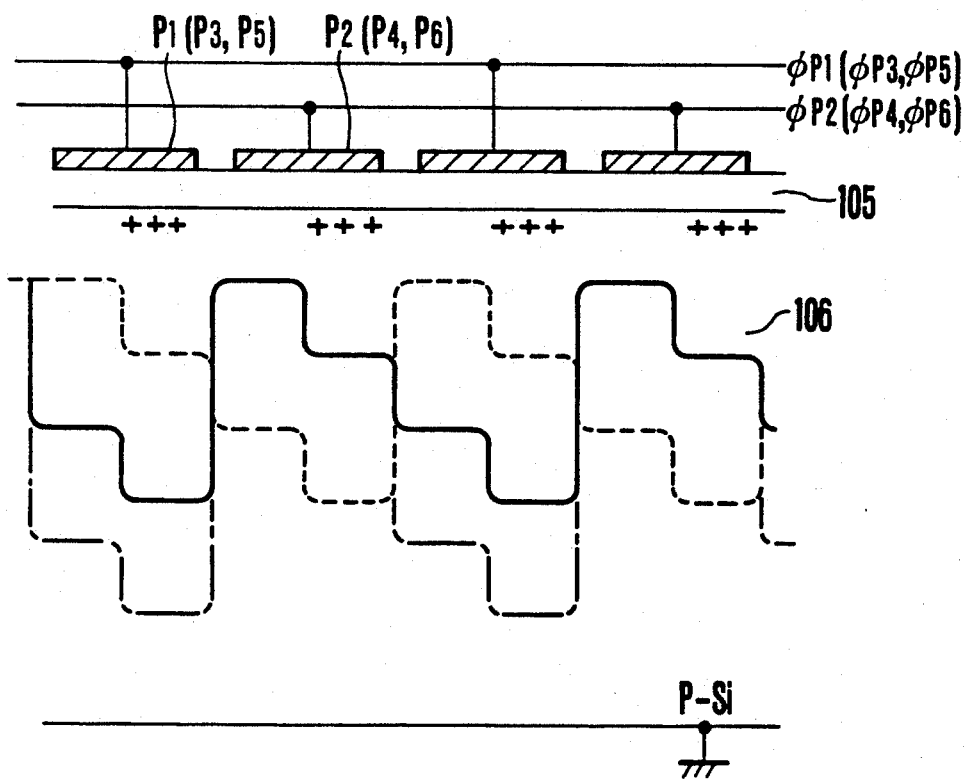
Figure 7:
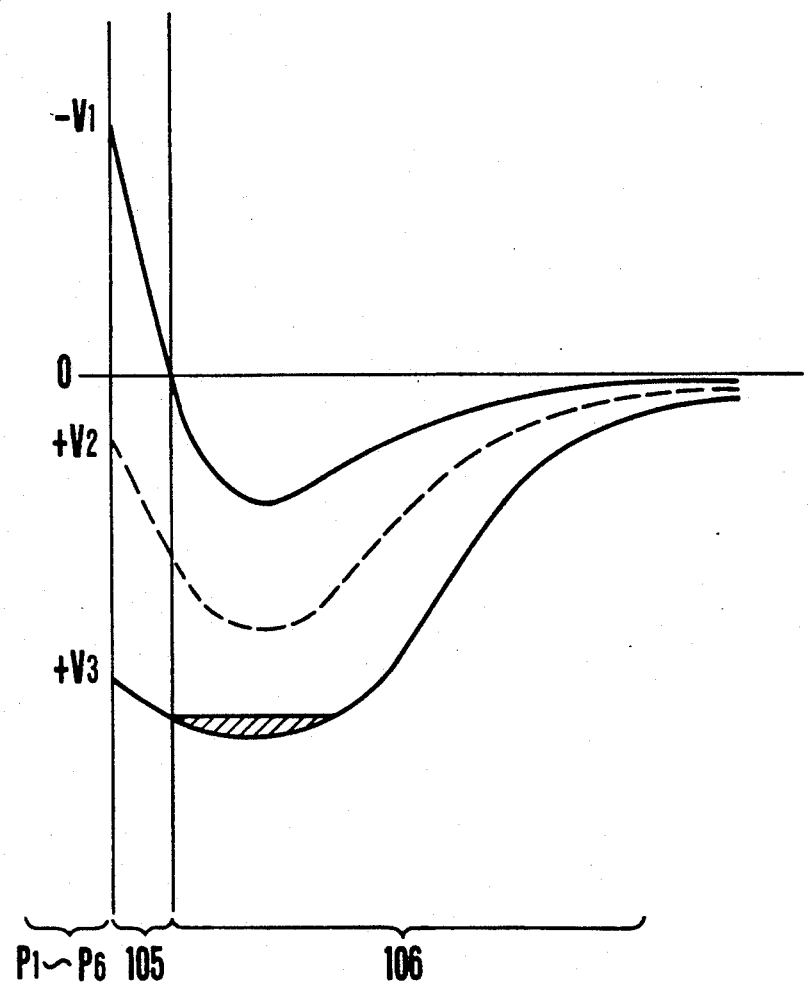

FIGS. 5 to 7 are drawings to explain such a blooming preventing method, with FIG. 5 being a front elevational view of a general frame transfer type CCD as an example of the CCD usuable as the image pickup element 15.

In the drawing, 101 is a light receiving portion comprising a plurality of vertical transfer registers having photo sensitivity.

Also, 102 is a storing portion comprising a plurality of light shielded vertical transfer registers. 103 is a horizontal transfer register. The information in all the vertical transfer registers of the storing portion 102 are shifted one bit at the same time to the horizontal transfer register 103, and then the register 103 is operated for horizontal transfer so that a video signal can be obtained from an amplifier 104.

In general, the information formed in each of the vertical transfer registers in the light receiving portion 101 is vertically transferred to the storing portion 102 during the vertical blanking period in the standard television system, and read out row by row from the horizontal transfer register 103 in the next vertical scanning period.

For note, here the light receiving portion 101, storing portion 102 and horizontal transfer register 103 are assumed each to be driven by two phases, their transfer electrodes are denoted by P1, P2, P3, P4, P5 and P6 respectively, and transfer clocks for them by $\phi P1$, $\phi P2$, $\phi P3$, $\phi P4$, $\phi P5$, $\phi P6$ respectively.

FIG. 6 illustrates potential profiles under such transfer electrodes P1 to P6. Beneath each of the electrodes provided on an insulating layer 105 which is on, for example, P type silicon substrate 106 are formed low and high potentials by ion injection or like technique. When a voltage of low level, or $-V1$, is applied to, for example, the electrodes P2, P4 and P6, while another voltage which is of high level, or V2, is applied to the electrodes P1, P3 and P5, a potential shown by a solid line is formed. On the other hand, when the voltage V1 is applied to the electrodes P1, P3 and P5 and the voltage V2 to the electrodes P2, P4 and P6, a potential shown by dashed line is formed.

Therefore, by applying an alternating voltage to each of the sets of electrodes P1, P3, P5 and P2, P4, P6 in the opposite phase to each other, the carrier is successively transferred to one direction (to the right in the drawing).

Also, a dot-and-dash line in the drawing indicates a potential in the case when a large positive voltage V3 is applied to the electrodes. This potential has its well inverted, so that the excessive carriers above a prescribed level are re-combined with the majority carriers and disappear.

FIG. 7 illustrates such shapes of interior potential with the variation of the electrode voltage as the parameter in respect to the thickness of the semiconductor substrate 106. As shown in the graph, for the electrode voltage V3, the potential well becomes shallower so that the excessive carriers are re-combined with the majority carriers at the interface with the insulating layer, or takes a second state.

Meanwhile, for the the voltage of $-V1$, a first state or accumulation state takes place so that the majority carriers are liable to concentrate near the interface, as they are supplied from, for example, a channel stopper region (not shown).

Therefore, by applying the voltages of $-V1$ and V3 alternatively to the electrode P1 under the condition that a barrier is formed by applying the voltage of $-V1$ to the electrode P2, the minority carriers accumulated under the electrode P1 is limited to below a prescribed level.

Therefore, in the embodiment of the invention, it is possible to prevent blooming during the period in which the signal is held in the image pickup element 15.

Also, after the AB control signal has been reset, the D-FFs 57, 83 and 88 are simultaneously reset by the output of an inverter 98-2 which is the inversion of the aforesaid REC pulse signal.

By the aforesaid sequence of operation, as shown in FIG. 4, the shutter 23 is opened as shown by a wave form of symbol 99, and the transfer pulse signal 100 is changed over in synchronism with the release signal when to make an exposure to write the video signal in the magnetic disk 10 in synchronism with the PG pulse signal (disk index) in a period indicated by a symbol 101.

In such a manner, the timing of the transfer pulse is changed over depending on the release signal. Because this gives priority to the exposure timing, it is made possible to realize an electronic camera which is easy to use for obtaining video signals of high quality by the control of the AB control signal.

Though, in the above-described embodiment, the timing is generated by the hard logic, it is of course possible to realize that timing by the sequence control of software as well.

As has been described above, according to the present invention, the recording timing from the release button is minimized, and any still picture can be recorded on the magnetic disk in right synchronism. This leads to a possibility of minimizing the unnecessary charge on the image pickup element.

What is claimed is:

1. An apparatus comprising:
   (a) means for converting an image into an electrical signal;
   (b) drive means for driving a recording medium for recording said electrical signal to move periodically, said means producing a first signal when recording medium motion reaches at least a prescribed speed, and a second signal each time when the phase of recording medium motion takes a prescribed state;
   (c) resetting means for resetting said convert means to an initial cleared state in response to said first signal;
   (d) means for reading out said electrical signal from said convert means in synchronism with said second signal after said convert means has been reset to said initial state and said image has been converted to said electrical signal.

2. An apparatus of claim 1, wherein said drive means includes:
   (a) means for driving said recording medium to move periodically;
   (b) means for detecting that recording medium motion has reached the prescribed speed to produce said first signal; and
   (c) means for detecting that recording medium motion takes the prescribed value of phase to produce said second signal.

3. An apparatus of claim 1, wherein said convert means is means having an effect of accumulating said electrical signal.

4. An apparatus of claim 3, wherein said resetting means is means for initializing said convert means by reading out electrical signal from said convert means.

5. An apparatus of claim 1, further comprising:
   (a) control means for controlling said readout means, said control means controlling said readout means so as to read out said electrical signal from said convert means after the elapse of a prescribed time from the setting of said convert means to the initial state by said resetting means.

6. An apparatus of claim 5, wherein said control means includes:
   (a) means for measuring light of said image;
   (b) means for setting said prescribed time depending on the output of said light measuring means; and
   (c) control means for controlling said readout means so as to read out said electrical signal from said convert means after the elapse of said prescribed time set by said setting means from the moment at which said convert means has been set in the initial state.

7. An apparatus of claim 1, wherein said recording medium is a disc and wherein said drive means rotates said disc periodically.

8. An apparatus of claim 1, further comprising:
   means for preventing blooming of said convert means in at least part of the interval from the moment at which said convert means has been set in said initial state to the moment at which said electrical signal is read out of said readout means.

9. An apparatus of claim 8, wherein said blooming preventing means is means for excluding that fraction of converted electrical signal by said convert means which exceeds a prescribed level.

10. An apparatus comprising;
    (a) means for converting an image into an electrical signal;
    (b) first control means for controlling the image incident on said convert means, said control means having a first state in which said image is conducted to said convert means and a second state in which it is not conducted to said convert means;
    (c) drive means for driving a recording medium for recording said electrical signal so as to move periodically, said drive means producing a first signal each time the phase of recording medium motion becomes a prescribed state, and for producing a second signal when recording medium periodic motion has reached at least a predetermined speed;
    (d) second control means for setting said convert means to an initial cleared state as said first control means changes from said second state to said first state, and for controlling said convert means so as to read out said electrical signal in response to said first signal produced after said first control means has changed from said first state to said second state; and
    (e) means for prohibiting said first control means from changing over from said second state to said first state until said second signal is produced.

11. An apparatus of claim 10, wherein said drive means includes:
    (a) means for driving said recording medium so as to move periodically; and
    (b) means for detecting that the phase of recording medium motion becomes the prescribed state to produce recording medium first signal.

12. An apparatus of claim 10, wherein said convert means is means having an effect of accumulating said electrical signal.

13. An apparatus of claim 12 wherein said second control means sets said convert means in said initial state by reading out electrical signal from said convert means as said first control means changes from the second state to the first state.

14. An apparatus of claim 10, wherein said first control means is means holding said first state for a prescribed time from the changeover from the second state to the first state.

15. An apparatus of claim 14, wherein said first control means includes,
   (a) means for measuring light of said image;
   (b) means for setting said prescribed time depending on the output of said light measuring means; and
   (c) means for returning said first state to said second state after the elapse of said prescribed time from the changeover from said second state to said first state.

16. An apparatus of claim 10, wherein said recording medium is a disc, and wherein said drive means rotates said disc periodically.

17. An apparatus of claim 10, wherein said second control means is means for setting said convert means to said initial state in every prescribed time despite said first control means is in the second state.

18. An apparatus of claim 17, wherein said second control means includes means for setting said convert means in the initial state by reading out an electrical signal from said convert means in every said prescribed time.

19. An apparatus of claim 10, further comprising:
   means for recording on said recording medium said electrical signal read out by said second control means.

20. An apparatus of claim 19, wherein said recording means is means for recording said electrical signal after subjected to signal processing.

21. An apparatus of claim 19, wherein said recording means includes a head.

22. An apparatus of claim 10 wherein said first control means is a shutter for controlling an image entering said convert means, said first state is an opening state of said shutter, and said second state is a closed state of said shutter.

23. An apparatus of claim 10, further comprising:
   means for preventing blooming of said convert means in at least part of a period in which said first control means is in the first state.

24. An apparatus of claim 23, wherein said blooming preventing means is means for excluding that fraction of converted electrical signal by said convert means which exceeds a prescribed level.

25. An apparatus comprising:
   (a) means for converting an image into an electrical signal;
   (b) means for generating a trigger signal for recording said electrical signal converted by said convert means;
   (c) means for driving a recording medium for recording said electrical signal so as to move periodically, said means producing a first signal when recording medium motion has reached at least a prescribed speed, and a second signal when the phase of recording medium motion becomes a prescribed state;
   (d) first control means for controlling the image entering said convert means, said first control means having a first state in which said image is conducted to said convert means and a second state in which it is not conducted to said convert means; and
   (e) second control means responsive to said trigger signal for actuating said driving means and controlling in such a manner that said first control means is changed over from the second state to the first state in response to said first signal generated by said driving means and after said first control means has then been returned from the first state to the second state, said electrical signal is read out in synchronism with said second signal.

26. An apparatus of claim 25, wherein said drive means includes:
   (a) means for driving said recording medium to move periodically;
   (b) means for detecting that recording medium motion has reached the prescribed speed to produce said first signal; and
   (c) means for detecting that recording medium motion takes the prescribed value of phase to produce said second signal.

27. An apparatus of claim 25, wherein said convert means is means having an effect of accumulating said electrical signal.

28. An apparatus of claim 25, wherein said second control means includes means for setting said convert means to an initial cleared state as said first control means is changed over from the second state to the first state.

29. An apparatus of claim 28, wherein said second control means includes means for setting said convert means to said initial state in every prescribed time despite said first control means is in the second state.

30. An apparatus of claim 29, wherein said second control means sets said convert means to said initial state by reading out an electrical signal from said convert means in every said prescribed time.

31. An apparatus of claim 25, wherein said recording medium is a disc, and wherein said drive means rotates said disc periodically.

32. An apparatus of claim 25, further comprising:
   means for preventing blooming of said convert means in at least part of a period in which said first control means is in the first state.

33. An apparatus of claim 32, wherein:
   said blooming preventing means is means for excluding that fraction of converted electrical signal by said convert means which exceeds a prescribed level.

34. An apparatus of claim 25, wherein said first control means is a shutter for controlling an image entering said convert means, said first state is an opening of said shutter, and said second state is a closed state of said shutter.

35. An apparatus comprising:
   (a) means exposable for converting an image into an electrical signal and for accumulating charge;
   (b) drive means for driving a recording medium for recording said electrical signal to move periodically, said drive means producing a first signal representative of the fact that recording medium motion reaches at least a prescribed speed; and
   (c) resetting means for resetting said convert means to an initial cleared state after said first signal has been produced by removing from said convert means an unnecessary charge accumulated before an exposure of said convert means.

36. An apparatus of claim 35, wherein said drive means includes:

(a) means for driving said recording medium to move periodically; and
(b) means for detecting that recording medium motion has reached the prescribed speed to produce said first signal.

37. An apparatus comprising:
(a) means exposable for converting an image into an electrical signal and for accumulating charge;
(b) drive means for driving a recording medium for recording said electrical signal to move periodically, said drive means producing a first signal representative of the fact that recording medium motion reaches a prescribed speed;
(c) first control means for controlling the image incident on said convert means, said control means having a first state in which said image is conducted to said convert means and a second state in which it is not conducted to said convert means;
(d) means for prohibiting said first control means from changing over from said second state to said first state until said first signal is produced; and
(e) resetting means for making said convert means an initial state after said first signal is produced by removing from said convert means an unnecessary charge accumulated before an exposure of said convert means.

38. An apparatus of claim 37, wherein said drive means includes:
(a) means for driving said recording medium to move periodically; and,
(b) means for detecting that recording medium motion has reached the prescribed speed to produce said first signal.

39. An apparatus comprising:
(a) means for converting an image into an electrical signal;
(b) drive means for driving a recording medium for recording said electrical signal to move periodically in response to periodical pulses, said drive means producing a first signal representative of the fact that recording medium motion reaches a prescribed speed;
(c) periodical pulse generating means for generating said periodical pulses for driving said convert means and said drive means; and
(d) resetting means for resetting said periodical pulse generating means in response to said first signal.

40. An apparatus of claim 39, wherein said drive means includes;
(a) means for driving said recording medium to move periodically; and
(b) means for detecting that recording medium motion has reached the prescribed speed to produce said first signal.

41. An apparatus of claim 39, wherein said convert means is means having an effect of accumulating said electrical signal.

42. An apparatus of claim 39, wherein said periodical pulse generating means is arranged to clear the electrical signal of said convert means when it is reset.

43. An image sensing apparatus, comprising:
(a) converting means exposable for converting an image into an electrical signal;
(b) drive means for driving a recording medium for recording said electrical signal to move periodically and for producing a periodical signal corresponding to the periodical motion of said medium; and
(c) controlling means for controlling said converting means, said controlling means being arranged to reset said converting means before exposure thereof, in response to an operational state of said drive means, and to read out said electrical signal in synchronism with said periodical signal after exposure.

44. An apparatus of claim 43, wherein said drive means includes:
(a) means for driving said recording medium to move periodically;
(b) means for detecting that recording medium motion has reached a prescribed speed to produce a first signal; and
(c) means for detecting that the motion takes a prescribed value of phase to produce a second signal.

45. An apparatus of claim 43, wherein said converting means effects accumulation in producing said electrical signal.

46. An apparatus of claim 43, wherein said recording medium is a disc and wherein said drive means rotates said disc periodically.

47. An apparatus of claim 43, wherein said converting means includes a CCD.

* * * * *

UNITED STATES PATENT AND TRADEMARK OFFICE
CERTIFICATE OF CORRECTION

PATENT NO. : 5,212,599

DATED : May 18, 1993

INVENTOR(S) : Shinji Sakai and Takashi Kawabata

It is certified that error appears in the above-identified patent and that said Letters Patent is hereby corrected as shown below:

Col. 2, line 59.   Change "photo-electrro" to -- photo-electric --

Col. 2, line 67.   Change "reflection of" to -- reflected by --

Col. 3, line 4.    Delete "as" and change "pivor" to -- pivot --

Col. 3, line 5.    Delete "is"

Col. 3, line 47.   After "of" insert -- the --

Col. 4, line 36.   After "signal" insert -- ) --

Col. 4, line 56.   Change "free run" to -- run free --

Col. 4, line 64.   Before "by" insert -- to --

Col. 5, line 62.   Change "AD" to -- AB --

Col. 5, line 67.   Change "usuable" to -- usable --

Col. 7, line 8.    Change "operation" to -- operations --

UNITED STATES PATENT AND TRADEMARK OFFICE
CERTIFICATE OF CORRECTION

PATENT NO. : 5,212,599
DATED     : May 18, 1993
INVENTOR(S) : Shinji Sakai and Takashi Kawabata It is certified that error appears in the above-indentified patent and that said Letters Patent is hereby corrected as shown below:

Col. 9, line 25, change "in" to --to --.

Signed and Sealed this

Eighteenth Day of January, 1994

Attest:

BRUCE LEHMAN

*Attesting Officer*   *Commissioner of Patents and Trademarks*